1,863,597

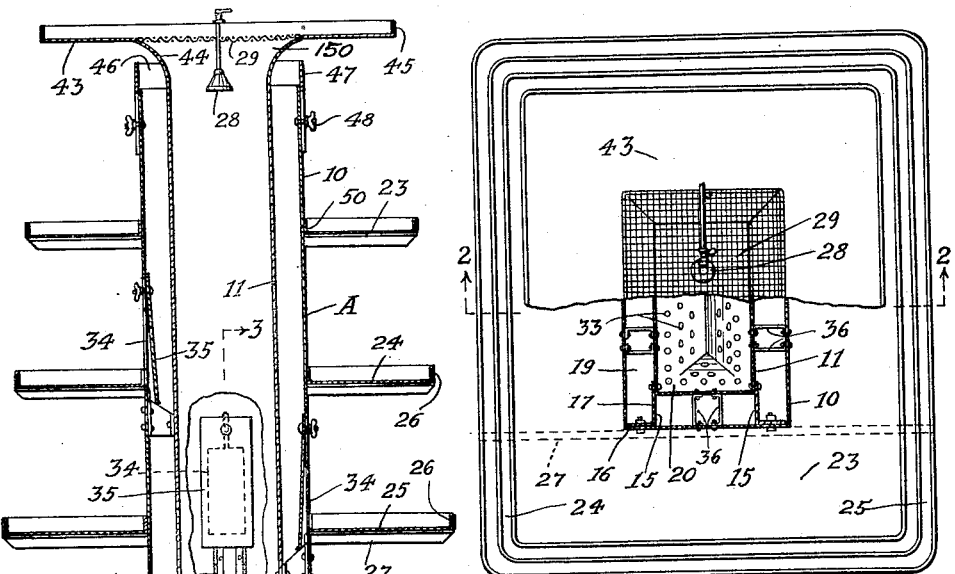
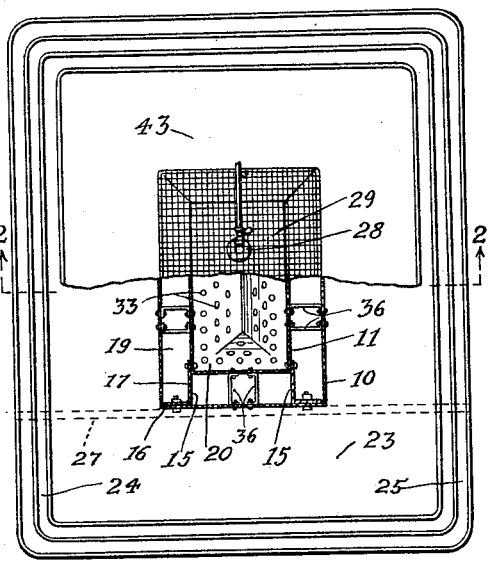
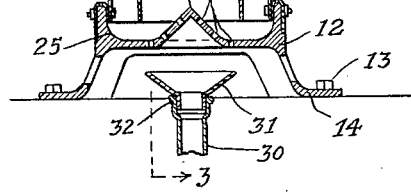
June 21, 1932. D. HANDELAN 1,863,597
DEVICE FOR DISPLAYING AND KEEPING HARVESTED VEGETATION FRESH
Filed April 29, 1929
Inventor
Daniel Handelan.
By Caswell & Lagaard
Attorney Patented June 21, 1932

UNITED STATES PATENT OFFICE

DANIEL HANDELAN, OF MINNEAPOLIS, MINNESOTA

DEVICE FOR DISPLAYING AND KEEPING HARVESTED VEGETATION FRESH

Application filed April 29, 1929. Serial No. 358,852.

My invention relates to devices for displaying and keeping harvested vegetation fresh, and has for its object to provide a device whereby harvested vegetation may be readily displayed and sprayed with water in finely divided form while being displayed.

Another object of the invention resides in providing a device whereby harvested vegetation may be maintained fresh by the passage of humidified air over the same.

An object of the invention resides in providing a case having an air passageway therein, together with means for humidifying the air passing through said passageway, and in further providing shelves or other supports for the objects to be maintained fresh positioned adjacent said case, and in further providing outlets from the passageway of said case for directing the humidified air from said case upon said objects.

Another object of the invention resides in constructing said case with a vertically disposed conduit together with a base for supporting the same, and in further providing a second conduit disposed within said first conduit in spaced relation thereto and forming a passageway therebetween, said base being constructed curved to bring the interior of said inner conduit into communication with said passageway.

A feature of the invention resides in arranging uprights in the form of angle members within said passageway for holding said inner conduit attached to said outer conduit in proper relation thereto, said angle uprights being attached to said base.

An object of the invention resides in attaching brackets or other supporting members to said angle members upon the exterior of the case for supporting said shelves in superimposed position.

Another object of the invention resides in arranging the discharge openings between said shelves to cause the humidified air to pass between said shelves and across the objects disposed upon said shelves.

A still further object of the invention resides in providing plates for the closure of said openings, and inclined rests for adjustably supporting the lower ends of said plates, and in further providing means for securing said plates in adjusted position, said plates being movable at their lower ends from the wall of the one conduit to the wall of the other conduit and being immovable at their upper ends to vary the degree of opening through said outlets.

Other objects of the invention reside in the details of construction thereof, and in the novel combination and arrangement of parts hereinafter illustrated or described.

In the drawing:

Fig. 1 is a plan view of a device for displaying and keeping harvested vegetation fresh, and illustrating an embodiment of my invention, a portion of said device being broken away to show the interior construction thereof.

Fig. 2 is an elevational sectional view taken on line 2—2 of Fig. 1.

Fig. 3 is a fragmentary elevational sectional view taken on line 3—3 of Fig. 2.

Fig. 4 is a detail sectional view of the closure used for one of the outlets of the humidifier and drawn to a larger scale than the other figures.

In the maintaining of harvested vegetables and other objects in a moist and fresh state, the usual manner has been to spray water in the form of drops or large globules directly upon the vegetation. In such cases either too much water was applied or if less was used the same was not uniformly distributed over the various objects. In such devices where an abundance of water was used, the vegetation frequently became injured, due to the mechanical force imparted through the sprayed water and frequently became limpid and ill appearing due to the excess of water brought in contact therewith. My invention overcomes these difficulties by providing a device whereby the water may be applied to the vegetation in a finely divided state, and in which the moisture is carried to the vegetation suspended in air so as to prevent mechanical injury thereto and at the same time apply the moisture in a manner to more readily preserve the natural characteristics of the vegetation and to maintain the same fresh and crisp, as in the case of leafy vegetation such as lettuce, spinach, etc.

My invention consists primarily of a case indicated in its entirety at A, which comprises an outer shell or conduit 10 preferably of rectangular form, and an inner conduit 11 of the same form as the said outer conduit, but of smaller dimensions so as to permit of the spacing of the walls thereof from the walls of said outer conduit. The conduit 10 is mounted upon a cast iron or other similar base 12 which is formed with legs 14 through which the same may be attached to the floor as through bolts or screws 13 and which holds the entire structure in erect position. The inner conduit 11 is attached to the outer conduit by means of four angles 15 disposed at the corners of the conduit 10 and running longitudinally thereof. These angles are arranged with the legs 16 thereof bolted to the end walls of the conduit 10 and with the legs 17 thereof volted at their ends to the side walls of the conduit 11. These angles are further secured to the casting 12 at the base thereof with bolts 18 which serve to hold the said case A and the entire superstructure rigidly attached to the base proper. It will be noted in Fig. 1 that the angles 15 maintain the inner conduit 11 spaced from the outer conduit so as to provide an annular space or passageway 19 therebetween, and to leave an inner space or passageway 20 within the interior of the conduit 11. The conduit 11 falls short of the bottom of the casting 12 so as to bring the passageway 20 into communication with the passageway 19, the air passing through these passageways and being reversed in direction at the lower end of conduit 11. To more readily facilitate this reverse in direction, the base 10 is formed with a curved portion 21 having an apex 22 at the center of the device. The air passing downwardly through the passageway 20 strikes the portion 22 of base 12 divides and is carried around the curved portion 21 of said bottom and uniformly distributed throughout the passageway 19.

About the exterior of the case A is mounted a number of shelves 23, 24 and 25 which completely encircle the said case. These shelves are preferably constructed with ledges 26 extending upwardly from the marginal portions thereof, and are supported upon a number of angle beams 27 passing beneath the same and attached to the flanges 16 of the angles 15. If desired, brackets or other suitable devices may be used in place of the beams 27. By means of this construction, the weight carried by the various shelves 23, 24 and 25 is directly transmitted to the angles 15 whereby the entire load is brought to the base 12 directly through the said angles, thereby relieving the body of the case from carrying any portion of the weight of the articles supported by the device or of the device itself.

At the top of the conduit 11 is disposed one or more spray nozzles 28 which are adapted to spray water downwardly in the passageway 20 in conduit 11 and to cause the air to circulate downwardly through the said conduit and upwardly through the passageway 19. For this purpose, the upper end of the conduit 11 is left open to provide an inlet indicated at 150 which is covered with a screen 29 utilized to prevent the entrance of foreign matter into the device. When the spray nozzles 28 are connected to water under pressure a fine spray of water is discharged into the conduit 11 which humidifies and circulates the air through the same.

For the purpose of disposing of the surplus water from the spray nozzles 28, a drain 30 is provided which is set into the floor of the building in which the device is to be installed. A funnel 31 adapted to be removably positioned within the open end 32 of drain 30 is positioned immediately below the central part of the base 12. This base is constructed with a number of holes 33 through which the surplus water may readily pass and drain into the funnel 31. In this manner, the surplus water is readily removed from the device, giving the proper degree of humidity to the air leaving the same. It will be noted that some of the holes 33 are positioned at relatively higher elevations than other of said holes, thereby serving as overflows to drain the water in the case of the plugging of the lowermost holes.

For the purpose of discharging the humidified air from the device, the conduit 10 is constructed with a number of outlets, some of which consist of openings 34 arranged between the various shelves 23, 24 and 25. These openings extend down to the level of the said shelves and serve to drain the water collected upon said shelves back into the interior of the device. Within the passageway 19 are disposed a number of inclined plates 35, which are positioned opposite the openings 34 and serve to direct part of the humidified air within the passageway 19 through the said openings and through the space between the various shelves 23, 24 and 25. The method of mounting these plates is shown in detail in Fig. 4. Immediately below the various openings 34 and within the passageway 19 are disposed a number of rests 36 which are in the nature of channels formed with web portions 37 and flange portions 38 and 39. The upper ends of the web portions of these rests are beveled as indicated at 40, the said portions inclining downwardly from the wall of the conduit 10 to the wall of the conduit 11. These rests are attached to the walls of the conduits 10 and 11 by means of rivets or bolts 49 and in addition to supporting the plates 35 also serve to stiffen the case proper, and to hold the walls of the said conduits in proper relation to one another. The lower edges of the plates 35 are adapted to rest upon the inclined edges 40 of the said rests while the upper ends of the said plates lie against the walls of the conduit 10. In this manner, a certain portion of the air passing through the passageway 19 is intercepted by the said plates and caused to discharge outwardly through the various openings 34. The amount of air discharged through the said openings may be varied by altering the position of the said plates upon the rests 36. This is accomplished as follows: The walls of the conduit 10 immediately above the openings 34 are provided with vertical slots 41. Bolts 42 pass through the upper portion of the plates 35 and through these slots thereby holding the plates 35 adjustably positioned upon the sloping surfaces 40 of the rests 36. When the plates 35 are in their uppermost positions the openings become entirely closed, thereby preventing the escape of air through the same. When the plates 35 are in the position shown at 42 in Fig. 4 in dotted lines, the maximum amount of air may pass through said openings. It can hence readily be comprehended that the amount of air discharged through any of the openings 34 may be manually regulated at will, and the bolts 42 being accessible from the interior may be readily manipulated to permit of the desired degree of regulation.

The upper end of the passageway 19 is also left open as best shown in Fig. 2 to provide another outlet 46 for the humidified air. To prevent the air from short circuiting from this outlet to the inlet 50, an outwardly flaring deflector 43 is employed which may be connected to the conduit 11 by means of a curved wall 44. This deflector is preferably constructed with a ledge 45 so as to simulate in appearance the various shelves 23, 24 and 25. Deflector 43, however, is primarily for the purpose of controlling the flow of air into and out of the device though the same may be used for displaying various articles not requiring moisture. The outlet 46 serves to provide humid air for the objects placed upon the shelf 23. The air flowing through this outlet may be regulated similar to the air passing through the outlets 34 by means of a sliding sleeve 47 which is attached to the upper end of the conduit 10 by means of bolts 48. With this construction, the distance between the upper end of the said sleeve and the deflector 43 may be regulated at will to control the volume of air passing through the said outlet 46.

In the use of the device, vegetables, fruits, berries and other vegetation which it is desired to display and maintain in a fresh and wholesome condition are arranged upon the shelves 23, 24 and 25. As the humid air is discharged from the outlet 46 and the openings 34, the same passes between the shelves 23, 24 and 25 and the deflector 43 and over the vegetation placed upon said shelves. Due to the weight of the humidified air caused by the water in the same, the air drops upon the vegetation and causes the water in the same to precipitate upon the vegetation in a manner to provide the proper moisture therefor without inflicting mechanical injury to the vegetation as is the case when heavy drops of water are employed. The surplus water deposited upon the various objects flows down upon the various shelves 23, 24 and 25 where the same from shelves 24 and 25 passes through the openings 34 and into the case proper. The water collected on shelf 23 passes through other openings 50 in the conduit 10 and into case A where the same flows through the openings 33 and into the drain 30. In this manner, water in finely divided state and in proper amount is deposited upon the vegetation and the surplus water from the device is rapidly removed so as to cause the device to, at all times, function in the proper manner.

My invention is highly advantageous in that an extremely simple and effective device is provided whereby green vegetation may be readily maintained in a fresh state while on display. The moisture is applied to the vegetation in a finely divided state when suspended in the air so that the same is more uniformly distributed over the articles as would be the case where globules of water of the size of drops were employed. At the same time, mechanical injury to the vegetation is entirely precluded. An extremely small amount of water is required to successfully operate my invention, and by humidifying the air passing over the vegetation, the same is considerably cooled, thereby reducing the temperature of the vegetation and serving to retain the original condition of the same. The various outlets may be regulated to cause the device to discharge in any direction so that all of a portion of the shelves may be utilized as required. The device is mounted on a substantial base and forms an attractive and serviceable condition to any store in which fresh vegetation is displayed for sale or other purposes.

Changes in the specific form of my invention, as herein disclosed, may be made within the scope of what is claimed without departing from the spirit of my invention.

Having described my invention, what I claim as new and desire to protect by Letters Patents is:

Claims:

1. In combination, a vertical conduit, means for supporting the same in upright position, a second conduit within said first conduit and spaced from the walls thereof to form a passageway therebetween, said inner conduit being in communication with said passageway, a plurality of shelves secured to said outer conduit and encircling the same, an inlet communicating with the upper end of said inner conduit, said outer conduit being formed with a plurality of openings disposed between said shelves and communicating with said passageway, said openings leading from said outer conduit in several directions over said shelves.

2. In combination, a case having a passageway therethrough, said passageway being formed with an opening, a shelf positioned in proximity to said opening means for supporting said shelf, a plate adjustably disposed within said passageway opposite said opening, and an inclined rest for supporting said plate in adjusted position.

3. In combination, a vertical conduit, a second conduit disposed within said first conduit and spaced therefrom, supporting members within said first conduit and attached thereto for holding said inner conduit in spaced relation to said outer conduit, a shelf carried by said outer conduit, and means for attaching said shelf to said supporting members.

4. In combination, a vertical conduit, a base for said conduit, a second conduit, disposed within said first conduit and spaced therefrom, a plurality of angle members disposed within said outer conduit and attached to said base for supporting said inner conduit relative thereto, a plurality of brackets secured to said members, and a shelf carried by said brackets.

5. In combination, a case providing a vertical air passageway, an inlet and a laterally extending outlet therefor, means for causing air to flow through said passageway, means for humidifying the air passing through said passageway, a shelf attached to said case and encircling the same, said case being formed with an outlet immediately above said shelf for conducting the humidified air from said passageway and across said shelf.

6. In combination, a vertical case having an air passageway therethrough, means for causing air to flow through said passageway, means for humidifying the air passing through said passageway, a plurality of superimposed shelves attached to said case and encircling the same, an inlet to said passageway, said case being formed with a series of outlets positioned between said shelves.

7. A case comprising a pair of spaced walls forming an air passageway, means for causing air to flow through said passageway, means for humidifying the air passing through said passageway, one of said walls having an opening therethrough, an inclined rest positioned below said opening and extending from one of said walls to the other, means for supporting said rest, a plate adjustably disposed between said walls and opposite said opening, and means for securing said plate in adjusted position against said rest.

8. In combination, a vertical conduit, a base for said conduit, a second conduit disposed within said first conduit and spaced therefrom, the end of said second conduit being spaced from said base and forming in conjunction therewith an air passageway, means for causing air to flow through said passageway, means within said second conduit for humidifying the air passing therethrough, a drain formed in said base, shelves mounted in proximity to said first named conduit, said first named conduit having openings therein disposed in proximity to said shelves, said shelves draining into said openings to cause the surplus moisture precipitated upon said shelves to drain upon said base and into the drain thereof and means for supporting said shelves.

9. In combination, a case forming a vertical air passageway, means for causing air to flow through said passageway, means for humidifying the air flowing through said passageway, means forming a drain at the bottom of said passageway, a plurality of shelves positioned adjacent said case and means for supporting said shelves, said case having openings communicating with said shelves, said shelves draining through said openings and into said case to the drain at the bottom thereof.

10. A case comprising a pair of spaced walls forming an air passageway, means for causing air to flow through said passageway, means for humidifying the air passing through said passageway, one of the walls having an opening therethrough, a shelf disposed in proximity to the lower edge of said opening, means for supporting said shelf, a plate adjustably connected to the wall having the opening therein immediately above said opening, said plate being movable in inclined relation toward the opposite wall to direct the air flowing through said passageway into said opening and over said shelf.

11. In combination, a case having an air passageway therethrough, an inlet in the top of said case open to the atmosphere and communicating with said passageway, said case having openings in the wall thereof serving as outlets, shelves positioned in proximity to said outlets, means for supporting said shelves, means for causing air to flow through said passageway, from said inlet to said outlets, and means within said case for humidifying the air passing through said outlets.

12. In combination, a case having an air passageway therethrough, an upwardly facing inlet in the top of said case open to the atmosphere and communicating with said passageway, said case having openings in the wall thereof serving as outlets, shelves positioned in proximity to said outlets, means for supporting said shelves, means within said case for causing air to flow through said passageway from said inlet to said outlets and means for humidifying the air passing through said outlets.

13. In combination, a case having an annular elongated passageway extending therethrough, means for causing air to flow along said passageway in the same direction throughout its extent, said case having outlets disposed at different localities about the periphery of the case and communicating with said annular passageway, means for humidifying the air passing through said outlets, shelves positioned adjacent said outlets and means for supporting said shelves.

14. In combination, a centrally disposed duct, means for causing humidified air to flow through said duct, a member for directing the humidified air from said duct about the entire periphery thereof and in substantially radial directions, a plurality of shelves disposed about said member and having portions thereof extending therefrom in various directions, means for supporting said shelves, said member having outlets for directing the humidified air over said shelves.

15. In combination, a vertical conduit, means within said conduit for causing air to flow from one end thereof to the other and for humidifying the air passing therethrough, a case forming an elongated annular passageway about said conduit, means for bringing the discharge end of said first named conduit into communication with one end of said annular passageway to cause the flow of humidified air along said annular passageway in the direction of the length thereof, said case having outlets therein disposed at various locations around the periphery of said case for conducting humidified air therefrom, shelves positioned in proximity to said outlets and means for supporting said shelves.

16. In combination, a vertical case having a passageway therethrough, means for causing air to flow through said passageway, means for humidifying the air passing through said passageway, a drain at the bottom of said case, a plurality of shelves disposed one above the other and attached to said case, said case having outlets for directing humid air over said shelves, said shelves draining directly into said case, the edge of each of the superimposed shelves being disposed inwardly of the shelf immediately below it to cause the moisture dripping from the edges of said shelves to be collected by the next lower shelf and drained into the case.

17. In combination, a case, a conduit within said case spaced from the walls thereof to provide an annular passageway therebetween, a member flaring outwardly from said conduit at one end thereof to form an outlet for said annular passageway, means for causing air to flow through said passageway, means for humidifying the air passing through said passageway, and a sleeve slidably mounted on said case and movable toward and from said member to vary the size of the opening between said case and said member, said case having other outlets, shelves positioned adjacent said other outlets and means for supporting said shelves.

18. In combination, a case, a conduit within said case spaced from the walls thereof to provide an annular passageway therebetween, a member flaring outwardly from said conduit at the upper end thereof to form an outlet for said annular passageway, means for causing air to flow through said passageway, means for humidifying the air passing through said passageway, a sleeve slidably mounted on said case and movable toward and from said member to vary the size of the opening between said case and member, said case having other outlets, shelves positioned adjacent said other outlets, means for supporting said shelves, and means for controlling the flow of air through said other outlets.

19. In combination, a case forming an air passageway, means for causing air to flow through said passageway, means at one end of said passageway for humidifying the air flowing through said passageway, means forming a plurality of outlets communicating with the other end of said passageway, shelves positioned in proximity to said outlets, means for supporting said shelves, and means between said humidifying means and said outlets for removing the surplus moisture and solid matter from the air prior to its passage through said outlets.

20. In combination, a vertical conduit, a base for said conduit, a second conduit disposed within said first conduit and spaced therefrom and providing air passageways through and about said second conduit in communication with one another, the end of said second conduit being spaced from said base, said second conduit being open at its upper end to form an air inlet to the passageway therethrough, means for causing air to flow through said passageway, means for humidifying the air passing through said passageways, said base forming a connection between said passageways having a bend and serving to reverse the direction of flow of air to remove the surplus water and the solid matter from the air, said first named conduit having a plurality of outlets, shelves positioned in proximity to said outlets and means for supporting said shelves.

In testimony whereof I have affixed my signature to this specification.

DANIEL HANDELAN.